A. F. BUNTING & J. MOHN.
SAFETY DEVICE FOR AUTOMOBILE ENGINES.
APPLICATION FILED JUNE 12, 1912.
1,066,793.
Patented July 8, 1913.
2 SHEETS—SHEET 1.
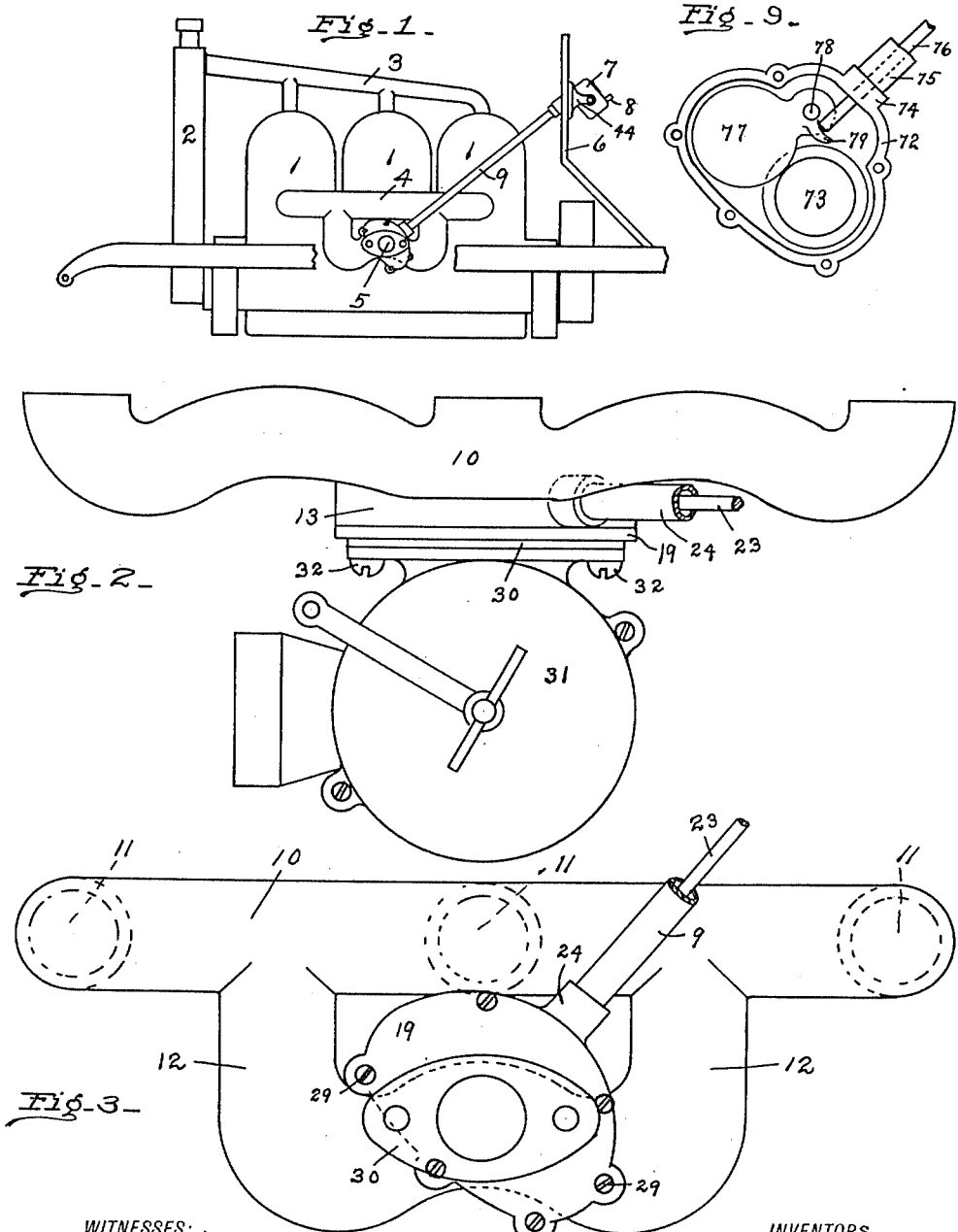

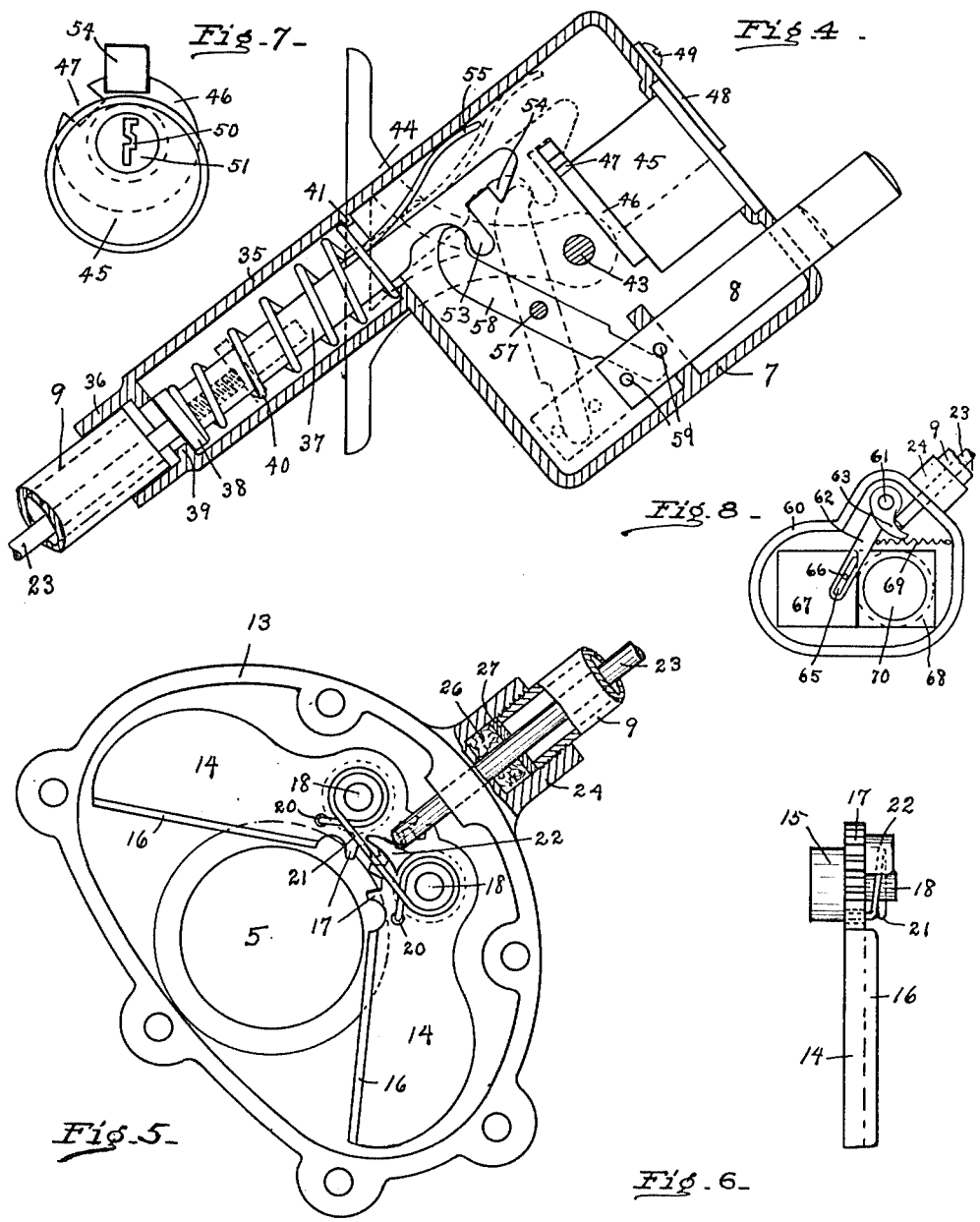

UNITED STATES PATENT OFFICE.

ARCHIBALD F. BUNTING AND JOHN MOHN, OF DETROIT, MICHIGAN.

SAFETY DEVICE FOR AUTOMOBILE-ENGINES.

1,066,793. Specification of Letters Patent. Patented July 8, 1913.

Application filed June 12, 1912. Serial No. 703,129.

*To all whom it may concern:*

Be it known that we, ARCHIBALD F. BUNTING and JOHN MOHN, citizens of the United States, and residents of Detroit, in the county of Wayne and State of Michigan, have invented a new and Improved Safety Device for Automobile-Engines, of which the following is a specification.

This invention relates to means for preventing the operation of internal-combustion engines, and its object is to provide a construction whereby the operators or chauffeurs of automobiles can positively prevent the operation of their machines.

This invention consists in a valve or gate mounted in the passage leading from the carbureter to the cylinders of the engine, which gate is normally held open by a manually-controlled device, together with means for automatically moving the gate to passage-closing position when the manually-operated device is released.

In the accompanying drawings Figure 1 is a diagrammatic view of a three-cylinder, two-cycle, internal-combustion engine, together with the radiator, the dashboard of the automobile, and the controlling device forming the subject matter of this application. Fig. 2 is a plan of a carbureter, a manifold and the safety device mounted between the two. Fig. 3 is an elevation of the manifold showing the cover of the body of the safety device. Fig. 4 is a vertical section of the controlling portion of the safety device. Fig. 5 is a view of the case and the gates therein, with the cover removed. Fig. 6 is an edge elevation of one of the gates of the safety device. Fig. 7 is an end view of a portion of the lock removed from the case. Figs. 8 and 9 are diagrammatic views of modifications of this construction.

Similar reference characters refer to like parts throughout the several views.

Theft and unauthorized use of automobiles has become so common that a number of devices have been suggested to prevent them. These devices usually consist of valves mounted either in the fuel tank or in the supply-pipe between the fuel tank and the carbureter, for the purpose of stopping the flow of fuel to the engine. Locks have been applied for the further purpose of preventing unauthorized opening of these valves. In each of these cases, the amount of fuel in the supply-pipe and in the carbureter has usually been sufficient to permit starting the automobile and running it for a considerable distance. The present construction is designed to absolutely prevent the automobile engine from operating under its own power.

The construction illustrated in the drawings consists in a gate or gates for closing the passage between the engine and the carbureter. The engine diagrammatically shown in Fig. 1 is a well known three-cylinder, two-cycle construction, but it is to be understood that this invention is not limited to engines of that type, but may be applied to engines of any other design and number of cylinders. The cylinders 1 are shown connecting to the radiator 2 by a manifold 3. A second manifold 4 is provided with an intake passage 5 to which the carbureter connects. Mounted on the dashboard 6 is a case 7 of the manually-operated controlling device, which is provided with a push-rod 8 and connects to the manifold 4 by means of a pipe 9. The details of these different parts may all be varied to adapt the invention to the different constructions of automobiles now on the market.

The manifold shown in the drawings comprises an upper cross passage 10 having openings 11 wherethrough the fuel may pass to the engine cylinders. This cross passage connects to the intake passage 5 by means of the branches 12. The intake passage 5 is preferably enlarged adjacent the branches 12 to form a chamber 13 for the valves or gates 14, which are provided with trunnions 15 as shown in Fig. 6, which fit depressions in the rear of the chamber 13. The inner edges of the gates 14 may be formed with strengthening ribs 16. The portions of the gates adjacent the trunnions 15 are formed with teeth 17 which mesh and thus compel the gates to move together. Each gate is formed with a small projecting pin 18 of such a height that the cover 19 will hold the trunnions 15 in the depressions in the chamber. Each of the gates is formed with a small perforation 20 to receive an end of the spring 21 which normally tends to hold them toward each other. One of the gates is formed with a lug 22 which is engaged by the rod 23, as shown in Fig. 5, to hold the gates apart and from over the passage 5. The chamber 13 is formed with an extension 24 into which the pipe 9 is screw-threaded. In order to form a tight joint around the rod 23, a washer 26 of felt or similar material and a metal washer 27 may be employed. It will be noticed that when the rod 23 is withdrawn, the spring 20 will swing the gates 14 toward each other and close the passage 5. This chamber 13 is covered by means of a plate 19 which is held in position by screws 29, and which has a bearing face 30 to which the carbureter 31 may be connected by means of screws 32, as shown in Fig. 2. This carbureter may be of any desired construction and forms no part of this invention. The construction used to hold this rod 23 downward against the lug 22 is shown in Fig. 4. It consists of a flat case 7 having a tubular extension 35, into the reduced end 36 of which the pipe 9 projects. It will be noticed that the pipe 9 is slidable in this reduced end, so that the vibration between the dashboard 6 and the engine will not have any injurious effect upon this safety device. The rod 23 screws into the bolt 37, which bolt is formed of a shoulder 38 normally held against the flange 39 by means of the spring 40, which spring also presses against the flange 41 formed on the case 7. A pin 43 extends through this case 7 and through the brackets 44, which brackets may be secured to the dashboard as shown in Fig. 1. By reason of this pin 43 being loose in the case and rigid with the brackets, the case 7 will be yieldably mounted, and thus unusual stresses will be avoided. Mounted in the case 7 is the body 45 of a "Yale" lock, connected to whose barrel 51 is a circular plate 46 having a notch 47. A small plate 48 pivoted on the screw 49 may be employed to swing across the key-hole 50 in the barrel 51. The bolt 37 is formed with a finger 53 and a catch 54, while a spring 55 normally holds this bolt toward the plate 46. It will be noticed that the ends of the tube 9 are securely held at both ends, but that the rod 23 is free to move at its upper end.

Pivoted on the small pin 57, which extends across through the case, is a lever 58 having one end in contact with the finger 53, and the other end extending into a slot in the push-rod 8. Pins 59 may extend across the slot to furnish bearings for the end of the lever. It is to be understood that the spring 40 is stronger than the spring 21.

The operation of this device is as follows: Under normal circumstances, the safety device will be as shown in Figs. 4 and 5. When the operator desires to safely leave his automobile for any length of time, he pushes in the rod 8 which causes the lever 58 to pull the bolt 37 up to the position shown in dotted lines in Fig. 4. The beginning of this movement will bring the catch 54 against the disk 46, and a continuation will swing this bolt outwardly so that the catch will pass this disk. After the catch has passed the disk, the spring 55 will swing it inward to the position shown in dotted lines in Fig. 4. As the rod 23 is connected to this bolt, it will be pulled away from the lug 22, shown in Fig. 5, and the spring 21 will be permitted to swing the gates 14 across the passage 5. When the gates are in that position, no fuel can be drawn into the engine, and therefore, there can be no operation. When the operator returns he inserts his key into the key-hole 50 and turns the disk 46 until the notch 47 is in line with the catch 54, whereupon the spring 40 will force the bolt and rod 23 downward, causing the gates 14 to separate and move to the position shown in Fig. 5. The passage between the carbureter and the engine being open, the engine can be started in the usual manner.

While the construction shown in Figs. 1 to 7 inclusive is the one we consider the most desirable, still our invention is not limited thereto. In Figs. 8 and 9 modifications are indicated which are samples of the changes which can be made in the construction of the parts, without departing from the spirit of our invention. In Fig. 8 a case 60 is shown which is of the same general construction as the case 13 previously described, and is provided with an extension 24 to receive the pipe 9 through which the rod 23 extends. A pin 61 carries a lever 62 having a lug 63 with which the rod 23 engages. The lever has a slot 65 which receives the pin 66, carried by the gate 67, which gate is slidable in a rectangular depression 68 in the back of the case 60. A small spring 69 connects to the lever 62 and to the case, and normally tends to move the gate 67 to the right across the passage 70. So long as the rod 23 presses down on the lug 63, the gate 67 will be held away from the passage 70, but upon the release of this rod 23, the gate will be pulled over across the passage 70 by the spring 69. Another modification is shown in Fig. 9 where the case 72 has a fuel passage 73 and an extension 74 for the pipe 75, through which the rod 76 extends. The gate 77 is pivoted on the pin 78 and has a lug 79 with which the lower end of the rod 76 engages. So long as this rod presses against the lug 79, the gate 77 will be held away out of the passage 73. But when the rod 76 is released, the gate 77 will swing across the passage 73 by gravity, thus closing the passage. It will be noticed that in each of these cases the rod 23 must be forced downwardly in order to hold the gate out of the path of the fuel. The advantage of this construction lies in the fact that should an unauthorized person attempt to steal the automobile and open the hood in order to reach this valve, he would be prevented by the pipe 9. If he attempted to tear out this pipe 9, he would thereby tear out the rod 23, and thus release the gate, which would remain in the passage-closing position. The spring 40 may be of any desired construction so long as it is strong enough to force the rod 23 downward with sufficient force to swing the valve from across the passage.

We claim—

1. In combination with a valve chamber adapted to be mounted between the carbureter and the cylinders of an internal combustion engine, said valve chamber having a passage, a valve in said chamber, means to normally hold said valve across the passage, a rod in engagement with said valve, a spring in engagement with said rod to cause the same to hold the valve out of said passage, means to move the rod against the tension of said spring to release the valve, and a lock to secure said rod in valve-releasing position.

2. In combination with a fuel-pipe between the carbureter and cylinders of an internal combustion engine, a valve chamber in said pipe, a pair of valves mounted in said chamber, a spring to swing the valves across the passage, a rod to swing the valves apart to open the passage, a spring to actuate the rod to swing said valves, a lever to move the rod outward against the tension of the last-named spring to permit the valves to close the passage, a manually-operated member to actuate the lever, and a lock to hold the rod in its outward position.

3. The combination with the fuel-pipe between the internal-combustion engine of an automobile and the carbureter thereof, of a valve chamber in the pipe, valves in said chamber adapted to swing to close the passage therethrough, a case mounted on the dashboard of the automobile, a pipe connecting the case and valve chamber, a rod slidable in the pipe and adapted to move downward to swing the valves to open the passage, a spring mounted in said case to move said rod downward, means mounted in the case to move the rod upward to release the valves, and means to lock the rod in its upper position.

4. The combination with a valve chamber, a valve therein to prevent the passage of fuel, a spring to move the valve, a rod to swing the valve to inoperative position, a spring to move the rod to such position, means to move the rod to release the valve, and a key-controlled locking device to hold the rod in inoperative position against the tension of the spring.

5. In combination with a valve body adapted to be inserted between a carbureter and an internal combustion engine, a valve mounted in said body and adapted to move across the passage therethrough, a spring to move the valve across said passage, a spring-actuated device to force the valve from across the passage, means to force said device to inoperative position, and a lock to secure said device in inoperative position.

6. In combination with a valve body adapted to be inserted between a carbureter and an internal-combustion engine, a valve mounted in said body and adapted to move across the passage through said valve body, a spring to move the valve across the passage, a lock and casing therefor, a connector extending from said valve to said lock casing whereby the valve may be held from across said passage, a spring mounted in said casing and operatively connected to said connector whereby said valve is held from across the passage, and means engaging said connector and spring and engageable by said lock whereby said spring may be resisted and the valve permitted to close the passage.

7. In combination with a pipe, a valve chamber in said pipe, a pair of valves pivotally mounted in said chamber and each having teeth whose pitch line is concentric with its pivot and which teeth mesh with those of the other valve so that said valves will move simultaneously toward and from each other, a spring to swing the valves across the passage in said pipe, one of said valves having a lug, a rod normally in engagement with said lug to swing the valves apart to open the passage, a spring to actuate the rod to swing said valves, a lever to move the rod outward against the tension of the spring to permit the valves to close the passage, a manually-operated member to actuate the lever, and a lock to hold the rod in its outward position.

In testimony whereof we have signed this specification in the presence of two subscribing witnesses.

ARCHIBALD F. BUNTING.
JOHN MOHN.

Witnesses:
EDWARD N. PAGELSEN,
HUGO W. KREINBRING.